United States Patent [19]

Yonkers

[11] 4,169,234

[45] Sep. 25, 1979

[54] RECIPROCATING MOTOR

[76] Inventor: Edward H. Yonkers, 905 Westerfield Dr., Wilmette, Ill. 60091

[21] Appl. No.: 757,066

[22] Filed: Jan. 5, 1977

Related U.S. Application Data

[63] Continuation of Ser. No. 549,963, Feb. 14, 1975, abandoned.

[51] Int. Cl.² .................................................. H02K 33/04
[52] U.S. Cl. .................................................... 310/29
[58] Field of Search ................................ 310/28–36, 310/15, 17, 19; 318/122, 132

[56] References Cited

U.S. PATENT DOCUMENTS

| 2,668,251 | 2/1954 | List ........................................ 310/28 |
| 2,681,419 | 6/1954 | Sherwen ................................ 310/29 |
| 2,733,360 | 1/1956 | List ........................................ 310/29 |

*Primary Examiner*—Donovan F. Duggan
*Attorney, Agent, or Firm*—Mason, Kolehmainen, Rathburn & Wyss

[57] ABSTRACT

A reciprocating motor in one embodiment includes a rigid base having a plurality of rectangular, thin, flat, steel springs each attached at one edge to the base. One or more elongated rigid members are attached to the opposite edges of the flat springs for substantially linear reciprocating motion as controlled by the thin, flat springs. At least one laminated, iron, armature core is rigidly attached to each of the reciprocating members. The laminae are positioned in the armature to be substantially normal to the direction of motion. The reciprocating motor further includes a laminated, iron stator core and a field coil securely mounted to the base for excitation by a suitably periodic electric current. The laminae in the stator core are also positioned substantially normal to the direction of the reciprocating motion. Due to the disposition of the armature and the stator laminae substantially normal to the direction of reciprocation, the magnetic flux generated in the stator laminae by current in the field coil provides an extended force-displacement characteristic in the direction of reciprocation. One alternate embodiment of the reciprocating motor additionally includes a counterweight armature attached to a plurality of rectangular, flat springs. The counterweight armature includes one or more laminated, iron, armature cores affixed thereto and is moved by the stator in a direction opposite to the direction of movement of a work armature to thereby maintain the base in a relatively stationary condition, substantially free from vibration.

14 Claims, 15 Drawing Figures

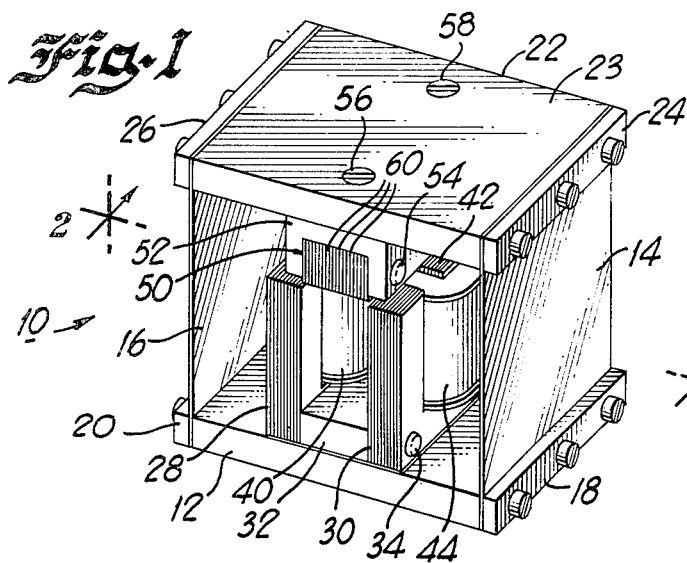
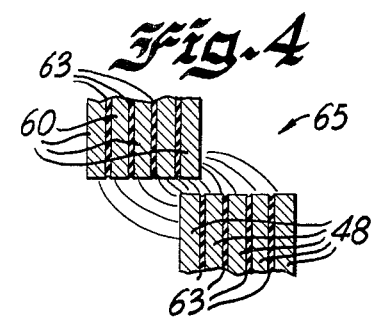
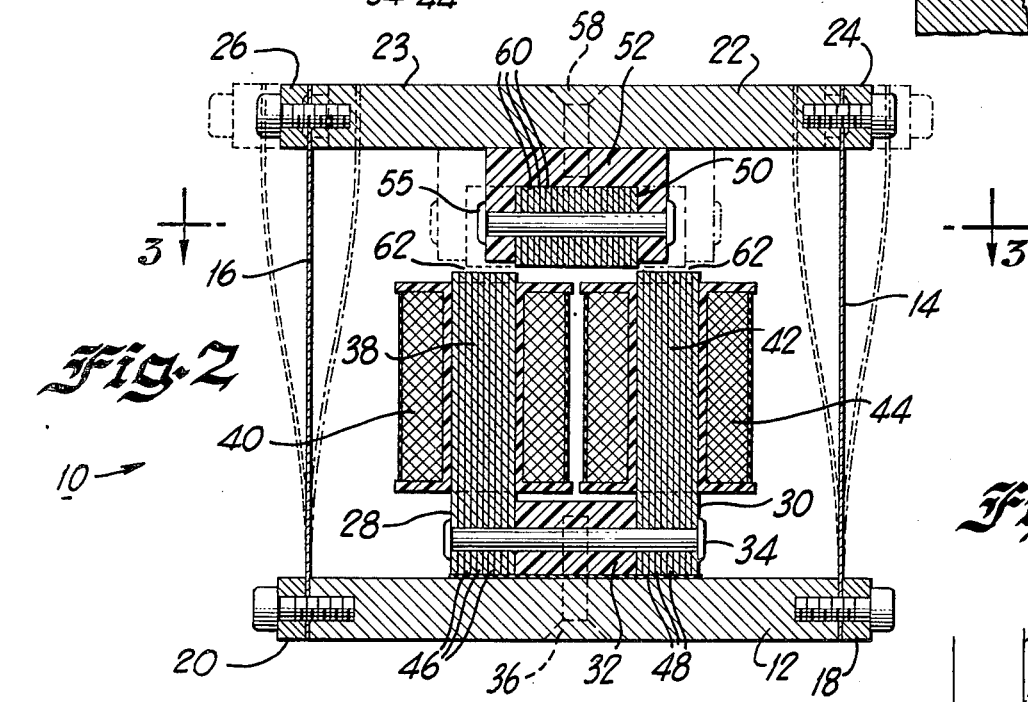
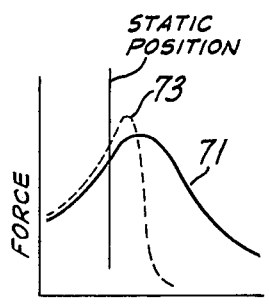
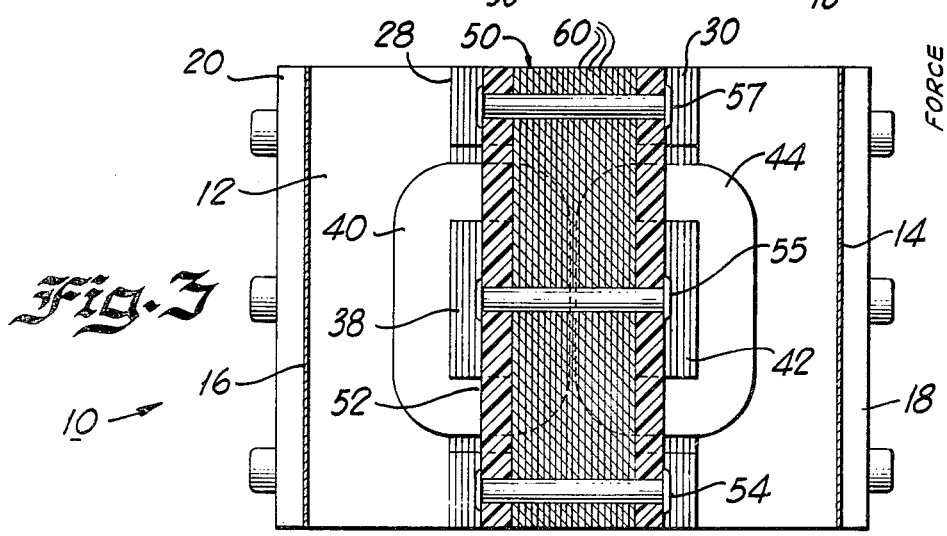

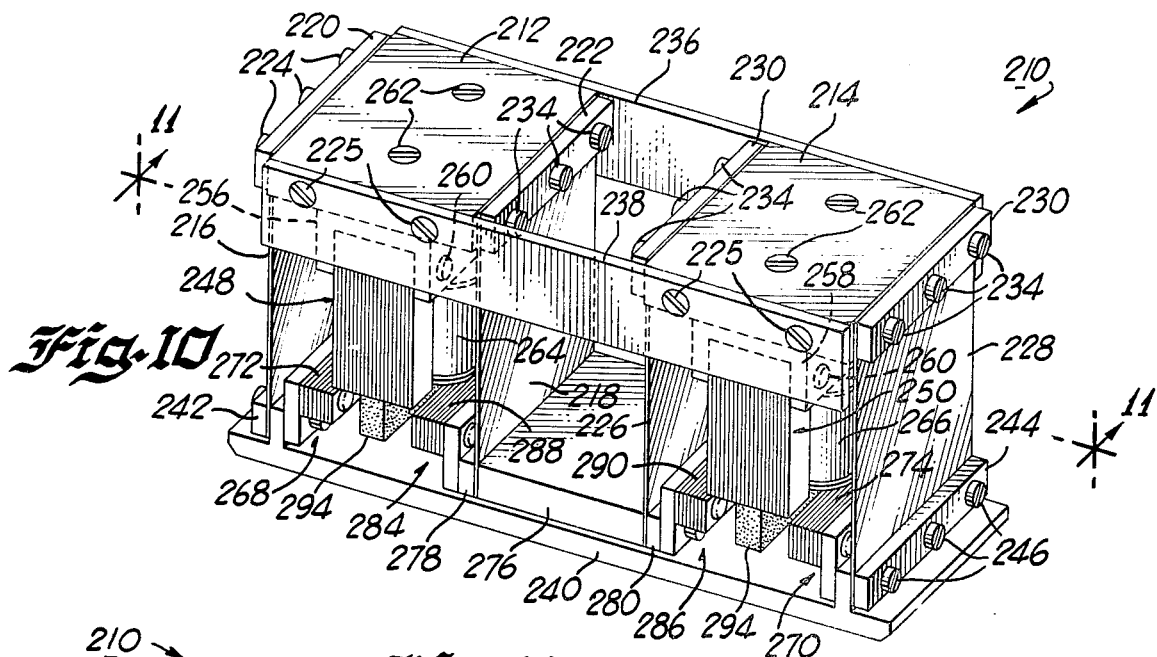
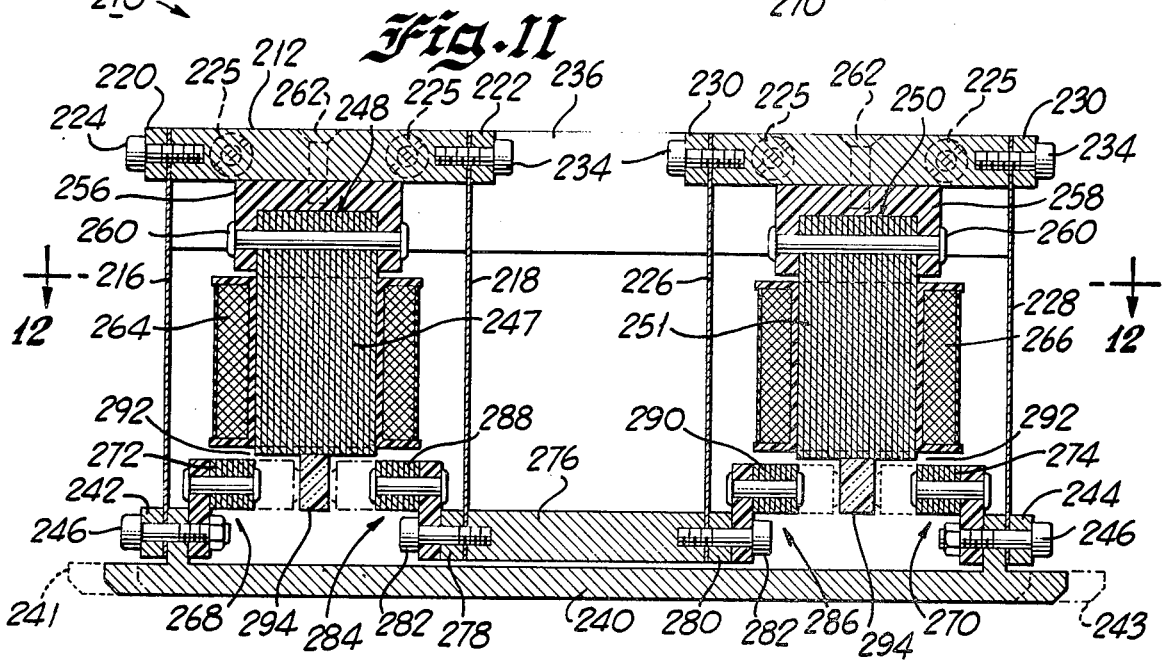
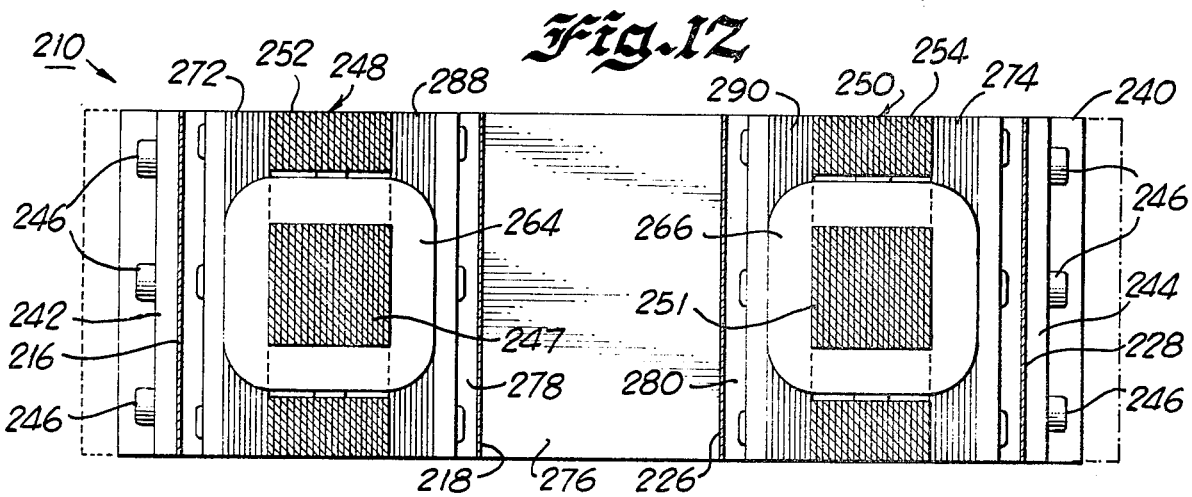

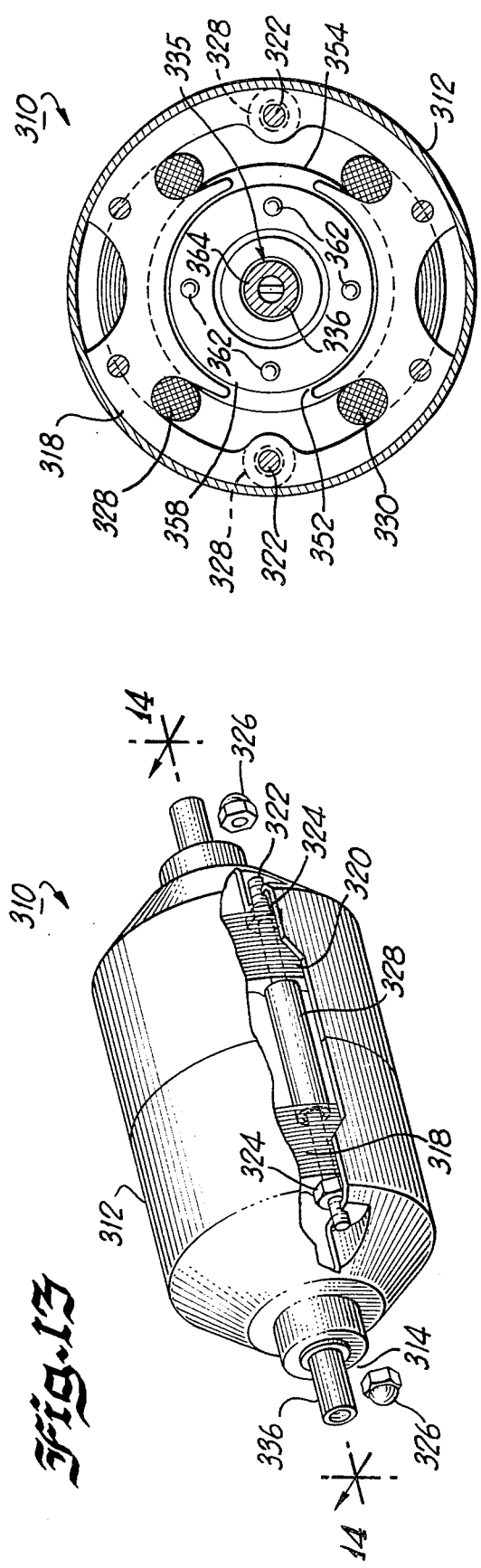
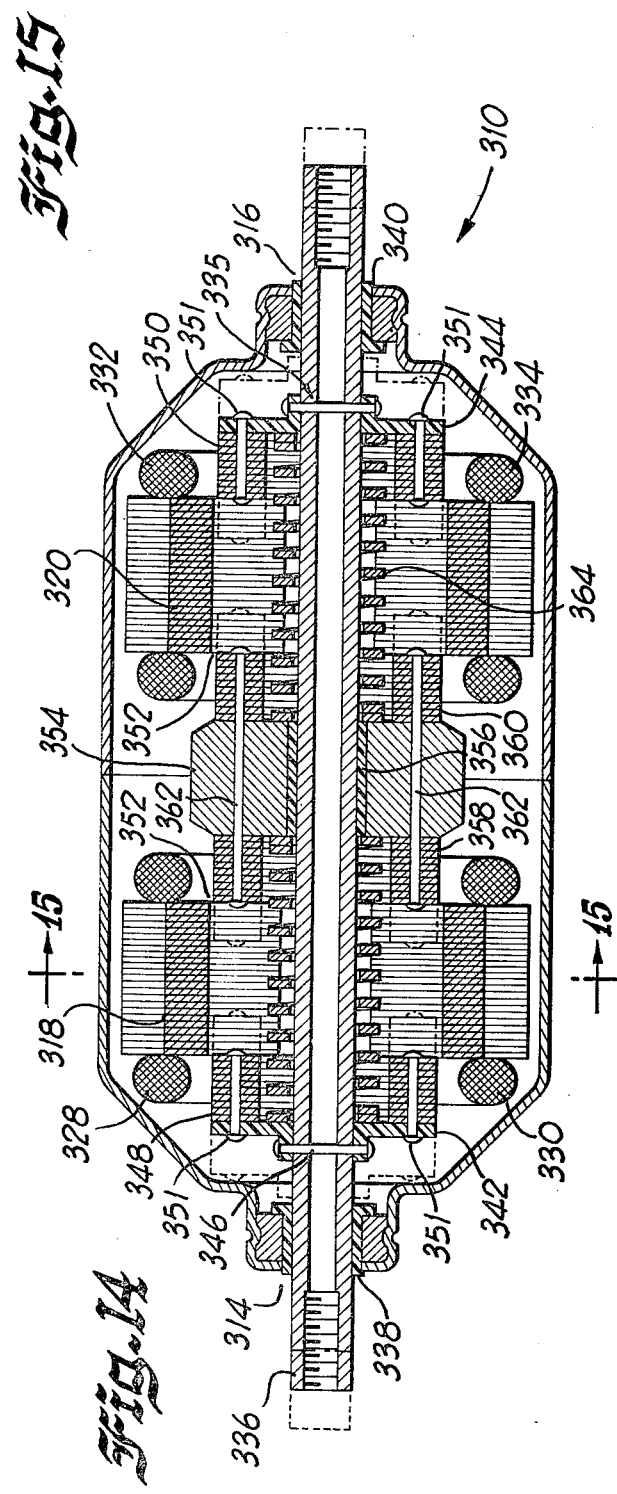

RECIPROCATING MOTOR

This is a continuation of application Ser. No. 549,963, filed Feb. 14, 1975 now abandoned.

BACKGROUND OF THE INVENTION

A. Field of the Invention

The device of the present invention generally relates to a new and improved reciprocating motor. More particularly, the device and teachings of the present invention may be incorporated in various new and improved reciprocating motor configurations.

B. Description of the Prior Art

Prior art in electromagnetic reciprocating motors extends back many years. However, the application of such devices to useful purposes has not been extensive because of their failure to meet competitive requirements in basic performance characteristics (i.e. amplitude, power, efficiency, cost and weight). Successful applications of electromagnetic reciprocating motors exist in limited fields, such as shearing tools, industrial material vibrators and small amplitude pumps. Most of such prior devices employ iron-clad solenoid type construction wherein a magnetic plunger or armature moves along the axis of a solenoid coil to vary the size of an air gap in the iron core system. If laminae are employed in the core structure to reduce eddy current losses, the planes of the laminae are generally parallel to the direction of reciprocation of the armature. This is also true of "clapper type" structures which are sometimes used in the design of vibratory motors. The force-displacement characteristic of such structures is not favorable for reciprocating motor action because the magnetic force along the direction of reciprocation is extremely nonuniform.

SUMMARY OF THE INVENTION

An object of the present invention is to provide a new and improved reciprocating or oscillatory motor.

Another object of the present invention is to provide a new and improved reciprocating or oscillatory motor having a laminated magnetic core wherein the planes of the laminae are generally normal to the direction of the reciprocating motion, resulting in improved magnetic force-displacement characteristics.

Another object of the present invention is to provide a new and improved reciprocating or oscillatory motor having laminated magnetic core members in which the planes of the laminae are generally normal to the direction of reciprocation and successive laminae are spaced by nonmagnetic material to vary the magnetic force-displacement characteristic as a controllable design parameter.

Similarly, another object of the present invention is to provide a new and improved reciprocating or oscillatory motor having improved means for counteracting magnetic forces between stator and armature core members that act in directions other than that of the reciprocation.

Moreover, another object of the present invention is to provide a new and improved reciprocating or oscillatory motor having a new and improved resonant spring-mass configuration in a reciprocating motor, resulting in substantially friction-free and controlled motion along the direction of reciprocation.

More specifically, another object of the present invention is to provide a new and improved reciprocating or oscillatory motor that includes one or more counterweights that reciprocate 180 degrees out-of-phase with one or more armatures to reduce or eliminate base or housing vibration.

Briefly, the present invention is generally directed to a new and improved reciprocating or oscillatory motor for use in a myriad of devices requiring reciprocating action. In one embodiment, the reciprocating motor includes an elongated rigid base carrying clamps to receive the ends of a plurality of thin, flat, rectangular, steel springs. One or more reciprocating members are attached to the other ends of the flat springs. The flat, rectangular springs and their manner of attachement to the base and reciprocating members are such that the reciprocating members are confined to a single substantially linear motion.

One or more laminated, iron, armature cores having laminae separated by nonmagnetic gaps and positioned generally normal to the direction of reciprocation are fixedly mounted on one or more of the armature members. The reciprocating motor also includes one or more laminated, iron, stator cores having laminae separated by nonmagnetic gaps and positioned both generally parallel to the direction of the armature laminae and generally normal or perpendicular to the direction of reciprocation. Each of the stator cores includes a field coil electrically connected to a source of pulsed electric current. Due to the positioning of the armature and stator laminae substantially normal to the direction of reciprocation, the magnetic flux generated in the stator core laminae by electric current in the field coil exerts a strong magnetic force of attraction in the direction of reciprocation on the armature laminae to provide an extended and more uniform force-displacement characteristic than in motor configurations having armature laminae positioned generally parallel to the direction of reciprocation.

Another embodiment of the reciprocating motor includes one or more counterweight armatures supported by a plurality of rectangular, flat, steel springs above a motor base. Each counterweight armature includes one or more laminated, iron, armature cores having laminae configured substantially the same as the armature laminae discussed above. Thus, when current flows in the field coil, the magnetic flux generated in the stator laminae provides a magnetic force to attract both of the work armatures and the counterweight armature for simultaneous movement in opposite directions to effect the cancellation of the inertial forces transmitted to the motor base from the movements of the work armature and of the counterweight armature to thereby maintain the motor base in a relatively stationary condition.

BRIEF DESCRIPTION OF THE DRAWINGS

Other objects and advantages and novel features of the present invention will become apparent from the following detailed description of a preferred embodiment of the present invention as illustrated in the drawings wherein:

FIG. 1 is a perspective view of a preferred embodiment of a reciprocating motor constructed in accordance with the principles of the present invention;

FIG. 2 is an enlarged, cross-sectional view of the device of the present invention taken along line 2—2 of FIG. 1;

FIG. 3 in an enlarged, cross-sectional, plan view of the device of the present invention taken along line 3—3 of FIG. 2;

FIG. 4 is an enlarged, fragmentary, detail view of the laminae of the stator and armature cores of the device of the present invention illustrated in FIG. 1;

FIG. 5 is an enlarged, fragmentary, detail view of the laminae of prior art stator and armature cores;

FIG. 6 is a graphical illustration of the force-displacement characteristics of prior art motors and of the motor of the present invention illustrated in FIG. 1;

FIG. 10 is a perspective view of a further embodiment of a reciprocating motor constructed in accordance with the principles of the present invention;

FIG. 11 is an enlarged, cross-sectional view of the device of the present invention taken along line 11—11 of FIG. 10;

FIG. 12 is an enlarged, cross-sectional view of the device of the present invention taken along line 12—12 of FIG. 11;

FIG. 13 is a partially cut-away, perspective view of a further embodiment of a reciprocating motor constructed in accordance with the principles of the present invention;

FIG. 14 is an enlarged, cross-sectional view of the device of the present invention taken along line 14—14 of FIG. 13; and FIG. 15 is an enlarged, cross-sectional view of the device of the present invention taken along line 15—15 of FIG. 14.

DESCRIPTION OF THE PREFERRED EMBODIMENT

Figure 7:
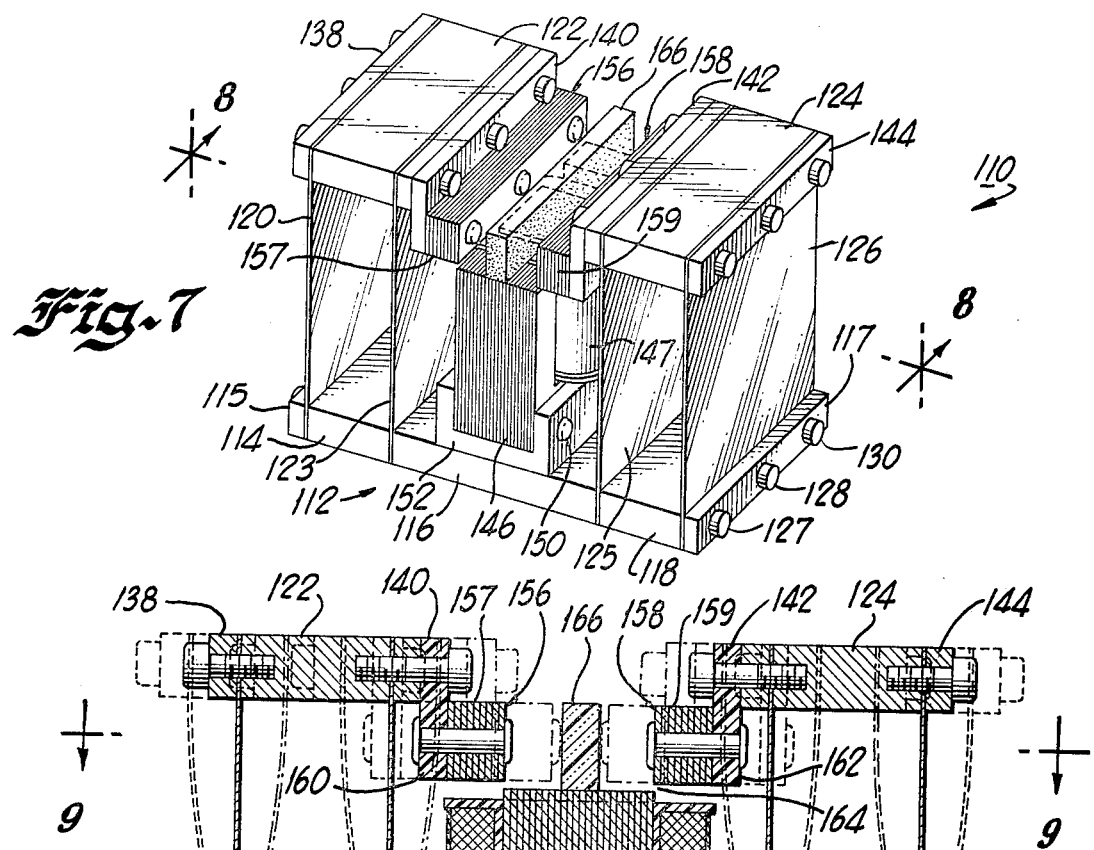
FIG. 7 is a perspective view of an alternative embodiment of a reciprocating motor constructed in accordance with the principles of the present invention.

With reference to FIGS. 1 through 3 of the drawing, there is illustrated a new and improved reciprocating motor 10 constructed in accordance with the principles of the present invention. The reciprocating motor 10 requires a suitable source of alternating current or pulsed direct current; and the principles underlying the reciprocating motor 10 will function effectively in a wide variety of devices, for example, a knife sharpener, a sander, a thumper or compactor for mixing or leveling materials, pumps, inertial drive systems, etc.

The reciprocating motor 10 includes a rigid base 12 having a plurality of rectangular, flat, steel springs 14 and 16 securely attached thereto by means of a plurality of end clamp members 18 and 20. A work armature 22 is secured to the opposite ends of the flat springs 14 and 16 by a plurality of end clamp members 24 and 26. The term "work armature" is intended to mean a moving or reciprocating member that either directly or indirectly performs work. For example, the work armature may be connected to a tool or other device to thereby drive the tool or device and perform work. Alternately, the inertial reaction forces resulting from the reciprocation of the work armature may be used as a controlled vibration source.

The thin, flat, wide, rectangular springs 14 and 16 with both ends clamped normal to the rigid base 12 and the rigid armature 22 form a rectangular parallelepiped. This particular geometrical structure functions in a manner which is uniquely favorable to the performance of the invention in that it permits only one degree of freedom, i.e. deflection of the armature 22 in the direction which is normal to the planes of the springs 14 and 16, and is capable of resisting very high forces in all other directions without significant deflection or frictional losses.

When the thickness of the springs is in the range of from one to two percent of their active length, the system is capable of useful reciprocation amplitude up to 20 percent of the active spring lengths. The springs 14 and 16 in this rectangular parallelepiped configuration are forced to follow the symmetrical cylindrical "S" curve shown in dotted lines on each side of the static position of the springs. The dotted lines in FIG. 2 represent the springs 14 and 16 in their extreme deflection to the left of their static positions and in their extreme deflection to the right of their static positions. This type of spring action subjects the entire active spring area to uniform strain and plays an important part in achieving the high force, high amplitude reciprocation which distinguishes the invention from prior devices.

In accordance with an important feature of the present invention, the reciprocating motor 10 includes two laminated, iron, stator cores 28 and 30. In a specific embodiment, the stator cores 28 and 30 are of an "E" configuration. The stator cores 28 and 30 are securely mounted to a support member 32 by means of a plurality of fasteners 34; and the support member 32 is secured to the base member 12 by a plurality of fasteners 36.

A field coil 40 is mounted about the center leg 38 of the stator core 28. In a similar manner, a field coil 44 is mounted about the center leg 42 of the stator core 30. The coils 40 and 44 are connected, in a preferred embodiment, to an alternating current power source through half-wave rectifiers so that the coils 40 and 44 are alternately energized, one on the positive half-cycle and the other on the negative half-cycle of the supply current.

In accordance with another important feature of the present invention, the stator cores 28 and 30 each include a plurality of planar, iron, core laminations or laminae 46 and 48, respectively, (FIG. 2) that are disposed substantially normal or perpendicular to the direction of the reciprocative path or motion of the work armature 22.

In accordance with an additional important feature of the present invention, a laminated, iron, armature core 50 is mounted on the work armature 22. The armature core 50 is secured to the work armature 22 by means of a support member 52 and a plurality of fasteners 54, 55 and 57. The support member 52 is in turn fixedly attached to the work armature 22 by a plurality of fasteners 56 and 58.

The armature core 50 includes a plurality of planar laminations or laminae 60 disposed generally normal or perpendicular to the direction of motion or the reciprocative path of the work armature 22. Moreover, the armature core 50 is mounted upon work armature 22 in a position such that the core 50 is spaced from the stator cores 28 and 30 by a minimum air gap 62. Thus, when the coil 40 and the core 28 are energized, the armature 22 will be deflected to the left along the path of reciprocation (FIG. 2); and, when the coil 44 and core 30 are energized on the next successive half cycle of current, the armature will be deflected to the right side of the center or static position.

These deflections take place as a result of the force produced by the magnetic field in the air gap between the armature core 60 and the energized stator core 28 or 30. The shape and magnitude of this magnetic field changes with the displacement of the armature 22 along the path of reciprocation. When the armature 22 is in the central position (FIG. 2), there is a large transverse component of force toward the energized stator core along the path of reciprocation parallel to the minimum gap 62. As the deflection toward the energized core increases the transverse component of force decreases and the vertical component of force which is normal to the path of reciprocation and across the minimum gap 62 rises to very high values. As previously explained, the rectangular parallelepiped configuration permits deflection response only to the transverse component of force and is capable of withstanding very high vertical forces across the minimum gap 62 without friction and without significant vertical deflection.

Obviously, the performance of this invention will be improved if the transverse component of magnetic force can be maintained as high as possible for as much of the deflection range as is possible. It is for this purpose that in this invention the planes of the laminae are placed normal to the direction of reciprocation, taking advantage of the oxide films which are normally present on the surfaces of iron core laminations.

In order to further enhance the desirable effect of this structural geometry, additional nonmagnetic spacing is introduced between all laminae of the core members.

Iron core lamination material normally carries a relatively heavy oxide coating which is a poor conductor of electricity and serves to reduce eddy current losses in electro-magnetic core members. The oxide film is also nonmagnetic and, therefore, serves a different purpose in this invention, namely, to increase the reluctance of the magnetic flux paths normal to the surfaces of the laminae. This desirable effect can be increased by increasing the nonmagnetic spaces between laminae still further. This is readily accomplished in practice, for example, by coating both sides of all laminae with insulating varnish in addition to the oxide film normally present. In this manner, the nonmagnetic spacing between the active iron in contiguous laminae may be on the order of 20% of the thickness of the active iron of the laminae. The effect of such nonmagnetic spacing of laminae in core members is to greatly increase the reluctance of the magnetic flux path through the laminations normal to the planes of the laminae as compared to the reluctance of an equivalent path parallel to the planes of the laminae.

The permeability of the iron commonly used in magnetic lamination stock is in the order of 5000 whereas that of air is one. Thus, it is clear that the reluctance of the flux path normal to the laminae of a core element with 20% air gaps between laminae would be in the order of 1000 times higher than the path in the same element parallel to the laminae.

In the present invention, the orientation of the spaced laminae normal to the direction of reciprocation prevents the rapid drop in transverse magnetic force and provides a much improved force-displacement characteristic.

This effect is graphically illustrated in FIGS. 4, 5 and 6. The solid line 71 expresses the force displacement relationship of a motor constructed in accordance with the principles of the present invention; and the dotted line 73 depicts the force displacement characteristics of a similar motor having laminae disposed parallel to the direction of reciprocation.

In accordance with an important feature of the present invention, the thicknesses of the gaps 63 (FIG. 4) may be varied to further vary force-displacement characteristics. For example, the thicknesses of the gaps 63 at the leading edge of the reciprocating armature core may be made relatively greater than the thicknesses of the gaps 63 at the trailing edge of the armature core to achieve a large transverse component of magnetic force during the initial displacement of the armature core followed by a large reduction in the transverse components of the magnetic force as the armature core approaches its maximum displacement from its at-rest position.

When the field coils 40 and 44 are energized as described, the half cycle pulses which generate the actuating magnetic fields will occur at the frequency of the alternating current power supply. In order to have the reciprocating motor system of the invention receive and store energy from the power supply, the natural frequency of the spring-mass system of the motor must be close to the forcing frequency, that is, the frequency of the power supply source.

The motor 10 including the thin, flat springs 14 and 16, the base 12 and the armature 22 in a rectangular parallelepiped structure represents a two-mass system with a sharp mechanical resonance response because of its relatively friction-free operation. The natural resonant frequency of such a two-mass system is defined by the following well known formula:

$$n = \frac{1}{2\pi} \sqrt{\frac{k(m_1 + m_2)}{(m_1 m_2)}}$$

where:
n represents the natural frequency of the system
k represents combined spring rate (deflection force)
$m_1$ represents the total mass of the armature 22
$m_2$ represents the total mass of the base The dimensions of the flat springs and the size of the $m_1$ and $m_2$ are easily controllable parameters which may be varied to bring about the desired resonance response to the pulsed power supply.

Obviously, the principles of the present invention as embodied in the motor 10 may be utilized in other motor configurations and devices. For example, a reciprocating, half-wave, motor 110 (FIGS. 7–9) includes a base 112 formed by three elongated planar members 114, 116 and 118 and two work armatures 122 and 124 disposed for reciprocative movement above the base 112. A plurality of rectangular, flat, steel, springs 120, 123, 125 and 126 are secured to the members 114 and 118 by a pair of clamping members 115 and 117 and by a plurality of fasteners 126, 128, 130, 132, 134 and 136. The work armatures 122, 124 are also secured by means of end clamping members 138, 140, 142 and 144 to the opposite ends of the flat springs 120, 123, 125 and 126 for reciprocating movement above the base 112.

Figure 8:
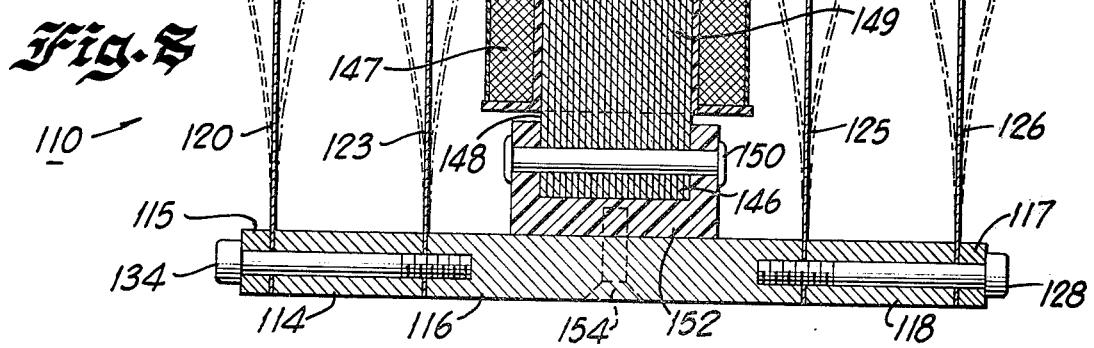
FIG. 8 is an enlarged, cross-sectional view of the device of the present invention taken along line 8—8 of FIG. 7.
Figure 9:
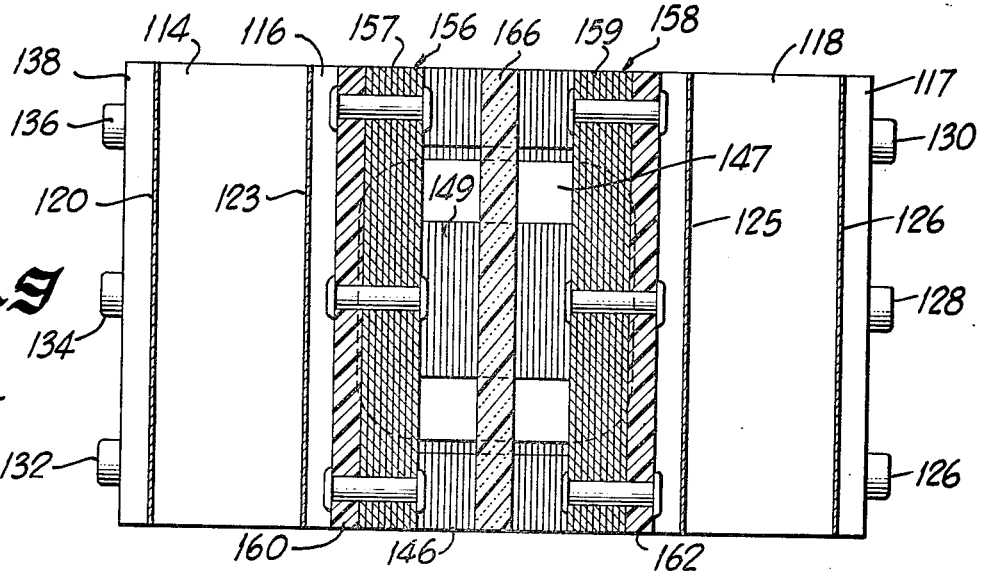
FIG. 9 is an enlarged, cross-sectional view of the device of the present invention taken along line 9—9 of FIG. 8.

In accordance with an important feature of the present invention, a laminated, iron, stator core 146 having a plurality of planar, iron, core laminae 148 is securely mounted to the base 112. The stator core 146 is secured by means of a plurality of fasteners 150 to a support element 152. The support element 152 in turn is secured to the base member 116 by one or more fasteners 154. As in the motor 10, the laminae 148 of stator core 146 of the motor 110 are positioned normal or perpendicular to the paths of travel or reciprocation of the work armatures 122 and 124 (FIG. 8).

A plurality of laminated, iron, armature cores 156 and 158 are securely mounted on the work armatures 122 and 124, respectively, by a pair of plates 160 and 162. The armature cores 156 and 158 include a plurality of laminae 157 and a plurality of laminae 159, respectively, disposed normal to the direction of movement of the work armatures 122 and 124 and with a controlled air gap 164 between the armature cores 156 and 158 and the stator core 146. Moreover, all of the laminae in the core elements 146, 156 amd 158 are separated by nonmagnetic gaps as discussed above with respect to the gaps 63 (FIG. 4).

A foam rubber, resilient member 166 is mounted on the stator core 146 an equal distance from the armature cores 156 and 158 in their at-rest positions. The member 166 limits the movements of the armature cores 156 and 158 and prevents their engagement with each other.

In a manner discussed previously, the stator core 146 is an "E" type core having a field coil 147 mounted about the central leg 149 of the core 146. In a specific embodiment, the coil 147 is electrically connected through a half-wave rectifier to an alternating current power source. Upon energization of the field coil 147, a magnetic flux is generated in the stator core 146 to cause the transverse component of the resultant magnetic force to move the armature cores 156 and 158 towards each other and the member 166. Upon deenergization of the coil 147, the energy stored in the deflected flat springs 120, 123, 125, 126 accelerate the work armatures 122 and 124 away from each other and the member 166. Consequently, the work armatures 122 and 124 reciprocate in a substantially linear direction 180 degrees out-of-phase with each other. Since, in a preferred embodiment, the amounts of travel and the masses of the work armatures 122 and 124 are substantially equal, the equal and opposite vibrations transmitted to the base 112 by their movements cancel to result in a reciprocating motor 110 substantially free from base vibrations.

A reciprocating motor 210 (FIGS. 10-12) is another alternative embodiment of the present invention and includes a pair of rigid base members 212 and 214 rigidly joined as one complete unit by a pair of support members 236 and 238 and by a plurality of fasteners 241. A plurality of rectangular, flat, steel springs 216, 218, 226 and 228 are attached to the base members 212 and 214 by a plurality of end clamping members 220, 222, 230 and 232 and by a plurality of fasteners 224 and 225.

An elongated, work armature 240 is secured to the opposite ends of the flat springs 216 and 228 by clamping members 242 and 244 and by a plurality of fasteners 246. The rectangular configuration of the flat springs 216 and 228 and their connections to the base members 212 and 214 and the work armature 240 are such that the path of movement of the work armature 240 is confined to a substantially linear direction (FIG. 11).

A pair of laminated, iron, "E" type, stator cores 248 and 250 having a plurality of laminae 252 and a plurality of laminae 254, respectively, are rigidly secured to a plurality of support members 256 and 258 by means of a plurality of fasteners 260. The support members 256 and 258 are rididly attached to the base members 212 and 214 by a plurality of fasteners 262. As in the previously mentioned embodiments of the present invention, the planar laminae 252 and 254 of the stator cores 248 and 250, respectively, are disposed generally normal or perpendicular to the direction of movement of the work armature 240. Correspondingly, a plurality of laminated, iron armature cores 268 and 270 having a plurality of laminae 272 and a plurality of laminae 274, respectively, disposed generally normal or perpendicular to the path of motion of the work armature 240 are mounted on the opposite ends of work armature 240.

A field coil 264 is mounted about a center leg 247 of the stator core 248. Similarly, a field coil 266 is mounted about the center leg 251 of the stator core 250. The coils 264 and 266 are each serially electrically connected to a source of alternating current power through half-wave rectifiers such that the coil 264, for example, is energized during the positive half-cycle and the coil 266 is energized during the negative half-cycle of the alternating current power.

The motor 210 further includes a counterweight armature 276 mounted on the other longitudinal ends of the flat springs 218 and 226. The term "counterweight armature" is intended to mean a reciprocating or oscillating member of the motor 210 that reciprocates 180 degrees out-of-phase with the work armature or armatures and serves to cancel resultant base vibration. The mass of the counterweight armature 276 is substantially the same as the mass of the work armature 240 and is mounted to the flat springs 218 and 226 by a plurality of connecting members 278 and 280 and a plurality of fasteners 282.

In accordance with a further important feature of the present invention, a plurality of laminated, iron, armature cores 284 and 286 having a plurality of laminae 288 and a plurality of laminae 290, respectively, that are disposed generally normal or perpendicular to the direction of movement of the counterweight armature 276 are securely mounted on the ends of the counterweight armature 276. The upper edges of the laminae of the armature cores 268, 270, 284 and 286 extend to the same vertical height (FIG. 11) and terminate in the same horizontal plane to thereby define a controlled air gap 292 between the armature cores 268, 270, 284 and 286 and their respective stator cores 248 and 250. Further, a plurality of resilient members or absorbers 294 are fixedly secured to the stator cores 248 and 250, respectively, to limit the movements of the work armature 240 and of the counterweight armature 276.

The laminae of the stator cores 248 and 250 and of the armature cores 268, 270, 284 and 286 are separated by a plurality of nonmagnetic gaps, as discussed above with respect to the gaps 63 (FIG. 4). When alternating current power is supplied to the motor 210, one of the coils, for example the coil 264, is energized during each positive half-cycle to move the work armature 240 to the right and the counterweight armature 276 to the left (see dotted lines in FIGS. 11 and 12). During each alternate or negative half-cycle, the coil 266 moves the work armature 240 to the left and the counterweight armature 276 to the right. Since the counterweight armature 276 is of the same mass as the mass of the work armature 240 and moves in a substantially equal and opposite direction to the movement of the work armature 240, the vibrations in the base members 212 and 214 resulting from the movements of the work armature 240 and the counterweight armature 276 are cancelled to thereby provide a substantially vibration free motor 210.

In accordance with a further important feature of the present invention, a full-wave reciprocating motor 310 (FIGs. 13-15) having a radially symmetrical or cylindrical configuration forms another alternate embodiment of the present invention. While the configuration of the motor 310 provides certain important advantages in the nature of a convenient structural envelope and a low overall weight, the motor 310 does utilize a bearing structure to control the movements of an axially reciprocating or oscillating armature.

The motor 310 includes an outer, generally cylindrically shaped split housing 312 that includes a pair of centrally disposed apertures 314 and 316 at opposite longitudinal ends of the housing 312. The motor 310 includes a plurality of annular, laminated, iron, stator cores 318 and 320 of a conventional two-pole design. Each of the stator cores 318 and 320 includes a plurality of generally circularly or annularly shaped laminae separated by nonmagnetic gaps corresponding to the gaps 63 (FIG. 4) discussed above. Further, in the same manner as the other embodiments of the present invention discussed above, the laminae of the stator cores 318 and 320 are disposed generally normal or perpendicular to the direction of movement of the armatures of the motor 310 as discussed hereinafter.

The stator cores 318 and 320 are securely retained in a stationary position within the housing 312 by a pair of elongated threaded rods 322. The stator cores 318 and 320 are maintained in a fixed, spaced apart relationship by a pair of elongated cylindrical spacers 328 that are disposed about the rods 322 and between these stator cores 318 and 320. The stator cores 318 and 320 are secured to the rods 322 by a plurality of nuts 324 that engage each longitudinal end of the rods 322. The split portions of the housing 312 are held together and the stator cores 318 and 320 are maintained in a stationary position within the housing 312 by a plurality of external nuts 326 that engage each longitudinal end of the rods 322 exteriorly of the housing 312.

The stator core 318 includes a pair of annular exciter or field coils 328 and 330 disposed about opposite poles of the stator core 318. The field coils 328 and 330 are electrically connected in series and are oriented about the poles of the stator core 318 so as to maintain their respective poles at opposite magnetic polarities.

Similarly, the stator core 320 includes a pair of annular, exciter or field coils 332 and 334 mounted about the two poles of the stator core 320. The field coils 332 and 334 are electrically connected in series and oriented about the poles of the stator core 320 so as to maintain their respective poles at opposite magnetic polarities upon excitation by a power source.

Preferably, the field coils 328 and 330 are connected to an alternating current power source through a half-wave rectifier of a first polarity. The coils 332 and 334 are connected to the alternating current power source through a half-wave rectifier of the opposite polarity. Thus, one pair of field coils, for example, the coils 328 and 330, are energized during the positive half-cycle of the alternating current; and the other pair of coils 332 and 334 are energized during the negative half-cycle of the alternatinc current. In this manner, each pair of field coils is energized and each of the stator cores 318 and 320 generates magnetic flux at the frequency of the alternating current power source.

The reciprocating motor 310 includes a work armature 335 having an elongated, axially extending, work armature shaft 336 that extends along the central axis of the housing 312 and to the exterior thereof through a pair of axial bearings 338 and 340 disposed in the apertures 314 and 316.

A pair of generally circular, end plate retainers 342 and 344 are securely mounted within the housing 312 at opposite longitudinal ends of the shaft 336 by a pair of mounting or fastening pins 346. In accordance with an important feature of the present invention, a pair of annular, laminated, iron, armature cores 348 and 350 are fixedly secured to the retainers 342 and 344 by a plurality of mounting or fastening pins 351. Each of the armature cores 348 and 350 includes a plurality of laminae disposed generally normal or perpendicular to the direction of movement or reciprocation of the shaft 336. The adjacent laminae are separated by nonmagnetic gaps in essentially the same manner as discussed above with respect to the nonmagnetic gaps 63 (FIG. 4). The outer diameters of the armature cores 348 and 350 are less than the inner diameters of the stator cores 318 and 320 by a predetermined, fixed amount to form a controlled air gap 352 therebetween. During the reciprocation of the shaft 336, the armature cores 348 and 350 freely move within and are spaced from the inner surfaces of the stator cores 318 and 320 by the controlled air gap 352.

The motor 310 further includes a generally annularly shaped counterweight armature 354 slidably mounted upon the shaft 336 by an elongated, axially extending bearing 356. The mass of the counterweight armature 354 is substantially equal to the mass of the work armature 335. A plurality of generally annularly shaped, laminated, iron, counterweight armature cores 358 and 360 are securely fixed to the counterweight armature 354 by a plurality of elongated pin fasteners 362. The outer diameters of the counterweight armature cores 358 and 360 are substantially equal to the outer diameters of the work armature cores 348 and 350 to thereby maintain the controlled air gap 352 between the counterweight armature core 358 and 360 and the stator cores 318 and 320.

Each of the counterweight armature cores 358 and 360 include a plurality of generally annularly shaped laminae disposed generally normal or perpendicular to the direction of movement of the counterweight armature 354. Preferably, all adjacent laminae in both stator and armature cores are separated by nonmetallic gaps as discussed above with respect to the gaps 63 (FIG. 4).

A plurality of elongated, axially extending, resilient, spring members 362 and 364 are mounted about the work armature shaft 336 for biasing the work armature 335 and the counterweight armature 354 to their at-rest positions (FIG. 14). The spring members 362 and 364 are compressed between the end plates 342 and 344 and the counterweight armature 354. The inner diamters of the armature cores 348, 350, 358 and 360 are greater than the outer diameters of the spring members 362 and 364 to thereby enable the armature cores 348, 350, 358 and 360 to freely move over and along the lengths of the spring members 362 and 364.

The energization of the coils 328 and 330 by one half-cycle of alternating current power results in the generation of magnetic flux within the stator core 318. An axial component of magnetic force resulting from the generation of magnetic flux within the stator core 318 draws the armature cores 348 and 358 within the stator core 318, resulting in the movement of the work armature shaft 336 to the right (FIG. 14), the movement of the counterweight armature 354 to the left (FIG. 14)

and the compression of the spring member 362. Upon the deenergization of the field coils 328 and 330, the compressed spring member 362 returns the work armature 335 and the counterweight armature 354 to their at-rest positions (FIG. 14). Upon the energization of the field coils 332 and 334 by an opposite half-cycle of alternating current power, the armature cores 350 and 360 are drawn within the stator core 320 and the spring member 364 is compressed by the axial component of the magnetic force resulting from the magnetic flux generated within the stator core 320. Upon the deenergization of the field coils 332 and 334, the compressed spring member 364 separates the armature cores 350 and 360 and returns the work armature 335 and the counterweight armature 354 to their at-rest positions (FIG. 14).

In this manner, the work armature 335 and the work armature shaft 336 are reciprocated along the longitudinal axis of the housing 312. Since the counterweight armature 354 is of the same mass as the mass of the work armature 335 and is moved along equal and opposite reciprocative paths along the longitudinal axis of the housing 312, the vibrations transmitted to the housing 312 of the motor 310 by the movements of the work armature 335 and the counterweight armature 354 cancel. Thus, radially symmetrical, full-wave reciprocating motor 310 is provided with a substantially inactive, vibration free base housing.

Obviously, many modifications and variations of the present invention are possible in light of the above teachings. Additionally, the various motor embodiments set forth above may be utilized to power many different types of tools. For example, an abrasive substance may be applied to the lowermost planar surface of the work armature 240 of the motor 210 (FIGS. 10–12) to provide a very efficient, reciprocating sander with an inactive, relatively vibration free base. Additionally, one or both ends of the work armature shaft 336 of the motor 310 (FIGS. 13–15) may be used to drive one or more fluid pumps. Thus, it is to be understood that, within the scope of the appended claims, the invention may be practiced otherwise than as specifically described above.

What is claimed as new and desired to be secured by Letters Patent of the United States is:

1. A reciprocative motor comprising
a stator element and an armature element each including a laminar magnetic core element wherein all magnetic laminae are parallel to each other and separated from each other by a non-magnetic material to form non-magnetic spaces, said stator core element including an energizing coil to magnetically polarize said core elements periodically, said armature element being movable along a linear reciprocative path normal to the planes of said magnetic laminae from a substantially closed-core position where the edges of at least a substantial portion of said laminae of said armature core element lie adjacent to and opposite the edges of said laminae of said stator core element to at least an open-core position where none of the edges of said laminae of said armature core element lies opposite any of the edges of said stator core laminae, and
means for supporting said armature element to provide resilient restraint along said reciprocative path and to provide a high restraint against movement of said armature element in directions parallel to the planes of said magnetic core laminae, substantially all of the magnetic flux passing through said magnetic core elements and the air gap therebetween being involved in producing force along said reciprocative path as said armature element moves from said open-core position to said closed-core position during a period of magnetic polarization, the extended range and magnitude of said force being a direct result of said non-magnetic spaces and the extent of said reciprocative path movement normal to the planes of said magnetic laminae of said stator core element and said armature core element.

2. A reciprocating motor comprising:
an armature including an armature core element, said armature core element including a plurality of parallel laminae formed from non-magnetic material and non-magnetic means for physically separating and spacing adjacent laminae to thereby form non-magnetic spaces between adjacent laminae;
a first stator core element including a plurality of parallel laminae formed from magnetic material, non-magnetic means for physically separating and spacing adjacent laminae to thereby form non-magnetic spaces between adjacent laminae, and
a field coil connection to an electric current source to produce magnetic flux in said first stator core element upon excitation of said coil by an electric current,
said armature being movable along a reciprocative path normal to the planes of said laminae of said armature core element and said first stator core element, said reciprocative path including movement of said armature core element from at least a first, open-core, non-aligned position wherein none of said plurality of laminae of said armature core element lie opposite any of said plurality of laminae of said first stator element to a second, closed-core, aligned position wherein a substantial portion of said plurality of laminae of said armature core element overlie and are directly opposite said plurality of laminae of said first stator core element;
a rigid base member; and
means for disposing said armature core element with respect to said first stator core element and for controlling the positioning of said armature core element over said reciprocative path, said armature core element being spaced apart from said stator core element over said entire reciprocative path, said disposing and controlling means comprising means fixedly secured between said base member and said armature,
said field coil of said first stator core element being alternately energized and de-energized by said electric current source to move sand armature core element over said reciprocative path, said first stator core element upon being energized by said field coil produces magnetic flux in said first stator core element, said armature core element and in the air gap between said stator core element and said armature core element with substantially all of the magnetic flux produced by current in said field coil of said first stator core element being utilized to provide a magnetic force component to move said armature core element from said first, open-core position to said second, closed-core position.

3. A reciprocating motor as defined in claim 2 further comprising a second stator core element, said second stator core element including a plurality of parallel laminae, non-magnetic means for physically separating and spacing adjacent laminae to thereby form non-magnetic spaces between adjacent laminae, a field coil for connection to an electric current source to produce magnetic flux in said second stator core upon excitation of said coil by an electric current, said first and second stator core elements being disposed opposite said armature core element in a direction along said reciprocative path and being alternately energized by said electric current source, said reciprocative path including movement of said armature core element from at least a third, open-core non-aligned position wherein none of said plurality of laminae of said armature core element lie opposite any of said plurality of laminae of said second stator core element to a fourth, closed-core aligned position wherein a substantial portion of said plurality of laminae of said armature core elements overlie and are directly opposite said plurality of laminae of said second stator core element.

4. A reciprocating motor as defined in claim 2 wherein said disposing and controlling means comprises a plurality of elongated flat springs including at least a first and second elongated flat spring each having a longitudinal end fixedly secured to said base member, said other longitudinal end of said first and second elongated flat spring being fixedly respectively attachd to opposite longitudinal ends of said armature.

5. A reciprocating motor as defined in claim 2 wherein said adjacent laminae of said armature core element and said stator core element are planar laminae and wherein said non-magnetic separating means of said armature core element and said stator core element comprise non-magnetic coatings on both planar sides of each one of said planar laminae such that the total thickness of said coatings is approximately twenty percent of the thickness of each one of said planar laminae.

6. A reciprocating motor as defined in claim 2 wherein the thicknesses of said non-magnetic spaces between a first plurality of said adjacent laminae of said armature core element are substantially greater than the thicknesses of said non-magnetic gaps between a second plurality of said adjacent laminae of said armature core element.

7. A reciprocating motor as defined in claim 2 wherein the thicknesses of said non-magnetic spaces are varied in a predetermined manner in order to provide said armature with a desired force-displacement characteristic.

8. A reciprocating motor as defined in claim 4 wherein said first and second springs and said armature form a rectangular parallelepiped motor configuration in an at-rest condition.

9. A reciprocating motor as defined in claim 2 wherein said electric current source comprises an alternating current source and further comprising a half-wave rectifier serially connected between said field coil and said alternating current source and further comprising a half-wave rectifier serially connected between said field coil and said alternating current source to pass alternate half cycles of electric current to said field coil.

10. A reciprocating motor as defined in claim 8 wherein the natural resonant frequency of the resilient parallelepiped motor configuration is substantially equal to the frequency of said source of electric current.

11. A reciprocating motor as defined in claim 10 wherein the natural resonant frequency is determined by the mass of said armature and the spring constants of said first and second springs.

12. A reciprocating motor as defined in claim 2 wherein said source of electric current is a predetermined frequency for energizing said motor and for initiating the reciprocative movement of said armature, the natural resonant frequency of said motor being substantially equal to said predetermined frequency.

13. A reciprocating motor as defined in claim 7 wherein said predetermined manner entails the thicknesses of said non-magnetic gaps increasing between successive adjacent laminae.

14. A reciprocating motor as defined in claim 13 wherein said increasing thicknesses of non-magnetic gaps are non-linear.

* * * * *